(12) United States Patent
Huang

(10) Patent No.: US 8,215,644 B2
(45) Date of Patent: Jul. 10, 2012

(54) SHAFT SEALING DEVICE

(75) Inventor: Cheng-Shiou Huang, Kaohsiung (TW)

(73) Assignee: Scenic Precise Element Inc., Kaohsiung (TW)

( * ) Notice: Subject to any disclaimer, the term of this patent is extended or adjusted under 35 U.S.C. 154(b) by 1002 days.

(21) Appl. No.: 12/189,874

(22) Filed: Aug. 12, 2008

(65) Prior Publication Data

US 2010/0038861 A1 Feb. 18, 2010

(51) Int. Cl.
*F16J 15/34* (2006.01)
(52) U.S. Cl. ........................................ 277/361; 277/370
(58) Field of Classification Search .................. 277/358, 277/361, 366, 370
See application file for complete search history.

(56) References Cited

U.S. PATENT DOCUMENTS

| | | | |
|---|---|---|---|
| 6,460,858 B1 * | 10/2002 | Kitajima et al. | 277/370 |
| 6,935,633 B2 | 8/2005 | Huang | |
| 2006/0061041 A1 | 3/2006 | Huang | |
| 2007/0246891 A1 | 10/2007 | Huang | |

* cited by examiner

*Primary Examiner* — Gilbert Lee
(74) *Attorney, Agent, or Firm* — Alan Kamrath; Kamrath IP Lawfirm, PA

(57) ABSTRACT

A shaft sealing device includes a gland having a flange with an axial hole, a coolant inlet, and a coolant outlet. A shaft sleeve is extended through the axial hole and mounted around a rotary shaft. A plurality of flexible elements extend through a plurality of through-holes in a retainer and each include two ends respectively presaging against two friction ring assemblies, allowing joint rotation of the shaft sleeve and the rotary shaft. The retainer further includes a first tangent groove having an inner end in communication with the axial hole and an outer end in communication with the coolant inlet. The retainer further includes a second tangent groove having an inner end in communication with the axial hole and an outer end in communication with the coolant outlet. Each of the first and second tangent grooves has a width decreasing from the inner end toward the outer end.

14 Claims, 5 Drawing Sheets

SHAFT SEALING DEVICE

BACKGROUND OF THE INVENTION

The present invention relates to a shaft sealing device and, more particularly, to a shaft sealing device with a dual sealing structure.

U.S. Pat. No. 6,935,633 issued Aug. 30, 2005 discloses a shaft sealing device including a sleeve, a flange, a seat ring, a compression ring, and a retaining ring. The sleeve is mounted on a rotary shaft of a machine and provided with an outer flange and a rotary ring mounted thereto. The flange is mounted on the machine and has an axial hole for supporting the sleeve that is rotatably extended therethrough. The flange further has a plurality of passages extending from the axial hole through an outer peripheral surface thereof for supplying and cycling fluid such as coolant. Thus, coolant can be fed into the axial hole via the passages for lubricating purposes. The seat ring is mounted in the axial hole of the flange and abuts against the rotary ring. The compression ring is fixed in the axial hole of the flange and includes a plurality of positioning holes and a plurality of tangent grooves. A flexible member is received in each positioning hole. The retaining ring is mounted around the sleeve and located between the seat ring and the compression ring. A plurality of engaging members are formed on a side of the retaining ring and engaged in the tangent grooves of the compression ring. The retaining member biased by the flexible members can only move in the axial direction and can not rotate. Thus, the retaining member presses the seat ring against the rotary ring, providing frictional contact between the seat ring and the rotary ring and, thus, providing enhanced sealing effect. However, the shaft sealing device of U.S. Pat. No. 6,935,633 is of a single-sealing type that is still less efficient in sealing effect than a dual-sealing structure more commonly utilized.

U.S. Patent Application Publication No. 2007/0246891 A1 discloses a shaft-sealing device including a shaft-mounting seat, a shaft-supporting mechanism, and a liquid guiding member. The shaft-mounting seat is mounted on a machine and includes a shaft bore for rotatably receiving a rotary shaft thereof. The shaft-mounting seat further includes a coolant inlet and a coolant outlet. Two seat rings are mounted in the shaft bore. The shaft-supporting mechanism includes a sealing-ring positioning assembly, two pushing members, a sleeve body, first and second rotatable sealing rings, and a sleeve-mounting member. The shaft-supporting mechanism is mounted around the rotary shaft for sealing purposes, with coolant flowing through the coolant inlet and the coolant outlet for lubricating purposes. The shaft-sealing device of U.S. Patent Application Publication No. 2007/0246891 A1 is of a dual-sealing type that provides more reliable sealing effect than a single sealing type. However, the friction between the seat rings and the first and second rotatable sealing rings is insufficient, since there is no mutual coupling arrangement therebetween.

A need exists for a shaft sealing device of a dual-sealing type to provide a reliable sealing effect.

BRIEF SUMMARY OF THE INVENTION

The present invention solves this need and other problems in the field of shaft sealing by providing, in a preferred form, a shaft sealing device including a gland having a flange with an axial hole. The gland further includes a coolant inlet in communication with the groove and a coolant outlet in communication with the axial hole. A shaft sleeve is extended through the axial hole of the gland and adapted to be mounted around a rotary shaft of a machine to rotate therewith. The shaft sleeve includes an end cap on an end thereof and a drive collar on the other end thereof. The end cap includes a first drive pin, and the drive collar includes a second drive pin. A first friction ring assembly includes a first rotatable friction ring mounted around the shaft sleeve and a first stationary friction ring mounted around the shaft sleeve. The first rotatable friction ring is coupled with the first drive pin. A second friction ring assembly includes a second rotatable friction ring mounted around the shaft sleeve and a second stationary friction ring mounted around the shaft sleeve. The second rotatable friction ring is coupled with the second drive pin. A guiding assembly is mounted between the first and second friction ring assemblies. The guiding assembly includes first and second compression rings mounted around the shaft sleeve and a retainer mounted around the shaft sleeve and between the first and second compression rings. The retainer includes first and second sides and a plurality of through-holes extending from the first side through the second side. A flexible element extends through each through-hole and includes a first end pressing against the first compression ring and a second end pressing against the second compression ring. Thereby, the first compression ring pushes the first stationary friction ring to press against the first rotatable friction ring while the second compression ring pushes the second stationary ring to press against the second rotatable friction ring. The first compression ring includes a plurality of first blocks slideably received in a plurality of first key ways of the retainer. The second compression ring includes a plurality of second blocks slideably received in a plurality of second key ways in the retainer. The retainer further includes a first tangent groove having a first inner end in communication with the axial hole and a first outer end in communication with the coolant inlet. The first tangent groove further includes first and second sidewalls and a first arcuate bottom wall interconnected between the first and second sidewalls. The first arcuate bottom wall includes a first inner edge located on an inner periphery of the retainer and a first outer edge. A first spacing between the first inner edge and the first side of the retainer is smaller than a second spacing between the first outer edge and the first side of the retainer. The first tangent groove has a width decreasing from the first inner end towards the first outer end. The retainer further includes a second tangent groove having a second inner end in communication with the axial hole and a second outer end in communication with the coolant outlet. The second tangent groove further includes third and fourth sidewalls and a second arcuate bottom wall interconnected between the third and fourth sidewalls. The second arcuate bottom wall includes a second inner edge located on the inner periphery of the retainer and a second outer edge. A third spacing between the second inner edge and the first side of the retainer is smaller than a fourth spacing between the second outer edge and the first side of the retainer. The second tangent groove has a width decreasing from the second inner end towards the second outer end.

In the most preferred form, the gland further includes a restraining ring mounted in the axial hole of the flange. The restraining ring includes a first restraining flange on an inner periphery thereof to limit axial movement of the first stationary friction ring. A cover is mounted in a positioning groove in a side of the flange and includes an axial hole through which the rotary shaft extends. The cover further includes an annular wall extending outward from a side thereof in a direction parallel to an extending direction of the axial hole thereof. The annular wall includes a second restraining flange on an inner periphery thereof to limit axial movement of the second stationary friction ring. The first outer edge of the first arcuate bottom wall of the first tangent groove is located on the second side of the retainer and spaced from an outer periphery of the retainer. A first opening is formed between the second side of the retainer and the restraining ring and adjacent to the first outer end of the first tangent groove. The first opening communicates the first outer end of the first tangent groove with the coolant inlet. The second outer edge of the second arcuate bottom wall of the second tangent groove is located on the second side of the retainer and spaced from the outer periphery of the retainer. The second side of the retainer and the restraining ring include a second opening formed therebetween and adjacent to the second outer end of the second tangent groove. The second opening communicates the second outer end of the second tangent groove with the coolant outlet.

The present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

Figure 1:
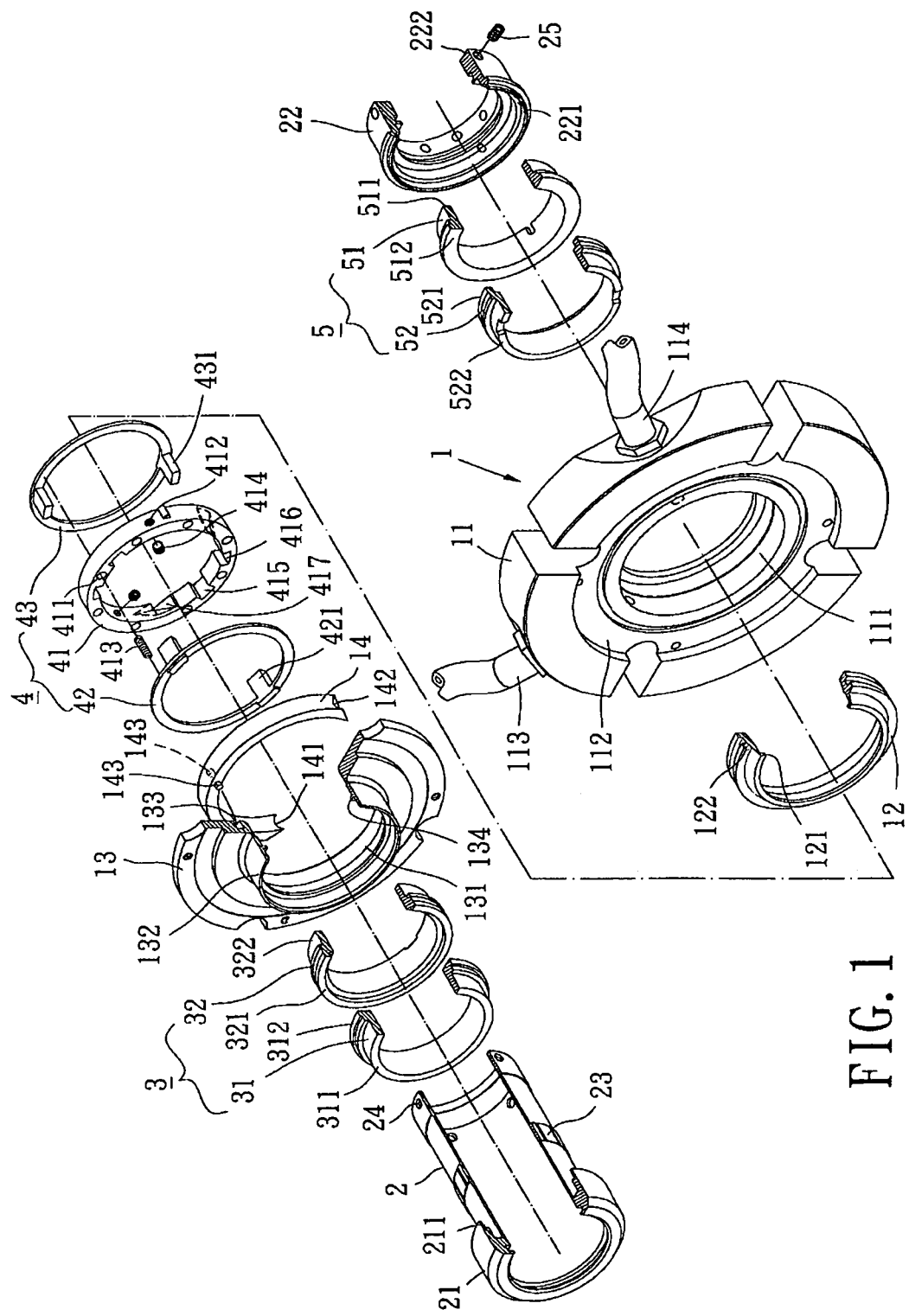
FIG. 1 shows an exploded, perspective view of a shaft sealing device according to the preferred teachings of the present invention.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "third", "fourth", "inner", "outer", "end", "portion", "section", "longitudinal", "axial", "radial", "lateral", "annular", "outward", "spacing", "width", and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

A shaft sealing device according to the preferred teachings of the present invention is shown in the drawings and generally includes a gland 1, a shaft sleeve 2, first and second friction ring assemblies 3 and 5, and a guiding assembly 4. Gland 1 is mounted to a machine 6 having a rotary shaft 61. Shaft sleeve 2 is securely mounted around rotary shaft 61 to rotate therewith. First and second friction ring assemblies 3 and 5 and guiding assembly 4 are mounted around shaft sleeve 2, with guiding assembly 4 sandwiched between first and second friction ring assemblies 3 and 5. Friction contact between guiding assembly 4 and first and second friction ring assemblies 3 and 5 provides a dual-sealing structure for machine 6.

According to the preferred form shown, gland 1 includes a flange 11, a restraining ring 12, a cover 13, and a guide plate 14. Flange 11 includes an axial hole 111 extending in a longitudinal direction thereof. Flange 11 further includes a positioning groove 112 in a side thereof. Further, flange 11 includes a coolant inlet 113 extending from an outer periphery thereof through an inner periphery thereof in a radial direction perpendicular to the longitudinal direction and in communication with axial hole 111. Flange 11 further includes a coolant outlet 114 annularly spaced from coolant inlet 113 and extending from the outer periphery thereof through the inner periphery thereof in the radial direction and in communication with axial hole 111. Coolant can flow from outside into axial hole 111 via coolant inlet 113 and then exit axial hole 111 via coolant outlet 114. Restraining ring 12 is mounted in axial hole 11 of flange 11 and includes a first restraining flange 121 in an inner periphery thereof for restraining movement of second friction ring assembly 5. Restraining ring 12 further includes a positioning hole 122 in a side thereof. Note that restraining ring 12 can be integrally formed with flange 11 as a single continuous monolithic piece.

Cover 13 is engaged in positioning groove 112 of flange 11 and includes an axial hole 131. Cover 13 further includes an annular wall 132 extending from a side thereof in a direction parallel to a longitudinal direction of axial hole 131. A second restraining flange 134 is formed on an inner periphery of annular wall 132 for restraining movement of first friction ring assembly 3. Further, cover 13 includes a positioning hole 133 in the other side thereof at a location adjacent axial hole 131. Guide plate 14 is coupled to the other side of cover 13 and in the most preferred form shown is a semi-circular ring, with guide plate 14 including first and second arcuate end faces 141 and 142 respectively on two ends thereof. A positioning pin 143 is formed on each of two sides of guide plate 14 to respectively engage with positioning hole 133 of cover 13 and positioning hole 122 of restraining ring 12 for positioning guide plate 14 in place.

According to the preferred form shown, shaft sleeve 2 includes an end cap 21 formed on an end thereof and a drive collar 22 is removably mounted to the other end of shaft sleeve 2. According to the most preferred form shown, the other end of shaft sleeve 2 includes a plurality of fixing holes 24, drive collar 22 includes a plurality of screw holes 222 aligned with fixing holes 24, and a plurality of screws 25 are extended through screw holes 222 and fixing holes 24 to fix drive collar 22 on shaft sleeve 2. A pumping groove 23 is formed on an outer periphery of shaft sleeve 2 between end cap 21 and drive collar 22. When shaft sleeve 2 rotates, pumping groove 23 guides coolant to lubricate first and second friction ring assemblies 3 and 5. End cap 21 includes a first drive pin 211 formed on an inner periphery thereof and facing pumping groove 23. Drive collar 22 includes a second drive pin 221 formed on an inner periphery thereof and facing pumping groove 23. First drive pin 211 couples with first friction ring assembly 3, and second drive pin 221 couples with second friction ring assembly 5.

According to the preferred form shown, first friction ring assembly 3 includes a first rotatable friction ring 31 and a first stationary friction ring 32 both made of abrasion-resistant material. A drive portion 311 is formed on a side of first rotatable friction ring 31 for coupling with first drive pin 211 of shaft sleeve 2, and a seal face 312 is formed on the other side of first rotatable friction ring 31. A seal face 321 is formed on a side of first stationary friction ring 32, and a pressing portion 322 is formed on the other side of first stationary friction ring 32. Seal face 321 of first stationary friction ring 32 is in friction contact with seal face 312 of first rotatable friction ring 31.

Figure 5:
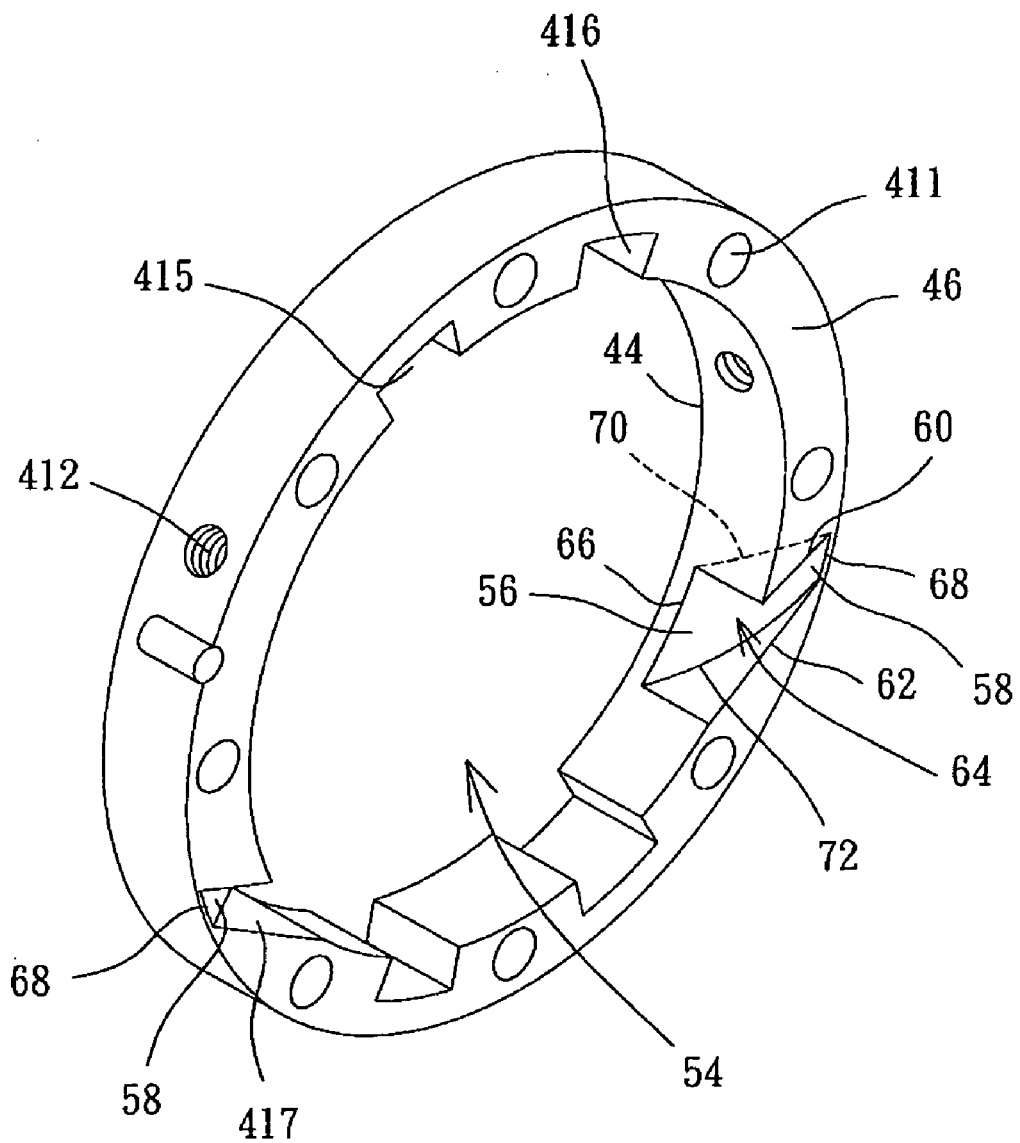
FIG. 5 shows a perspective view of a retainer of the guiding device of FIG. 4.

According to the preferred form shown, guiding assembly 4 includes first and second compression rings 42 and 43 and a retainer 41 between first and second compression rings 42 and 43. Retainer 41 includes opposite first and second sides 44 and 46 and a plurality of through-holes 411 extending from first side 44 through second side 46. A flexible element 413 extends through each through-hole 411. Retainer 41 further includes a plurality of screw holes 412 extending from an outer periphery thereof through an inner periphery thereof. A screw 414 is received in each screw hole 412. The inner periphery of retainer 41 further includes a plurality of first key ways 415 extending from first side 44 through second side 46 and a plurality of second key ways 416 extending from first side 44 through second side 46. First and second tangent grooves 417 are formed in second side 46 of retainer 41. First tangent groove 417 includes an inner end 56 (FIG. 5) in communication with an axial hole 54 of retainer 41 and an outer end 58 in communication with coolant inlet 113. More specifically, first tangent groove 417 includes first and second sidewalls 60 and 62 and an arcuate bottom wall 64 interconnected between first and second sidewalls 60 and 62. Arcuate bottom wall 64 includes an inner edge 66 located on the inner periphery of retainer 41 and spaced from first side 44. Arcuate bottom wall 64 further includes an outer edge 68 located on second side 46 and spaced from the outer periphery of retainer 41 and shorter than inner edge 66. Note that a spacing between inner edge 66 and first side 44 is smaller than that between outer edge 68 and first side 44. Arcuate bottom wall 64 further includes first and second arcuate lateral edges 70 and 72. First arcuate lateral edge 70 is interconnected between an end of inner edge 66 and an end of outer edge 68. Second arcuate lateral edge 72 is interconnected between the other end of inner edge 66 and the other end of outer edge 68. An opening 74 (FIG. 2) is defined between second side 46 of retainer 41 and restraining ring 12 adjacent to outer end 58 of first tangent groove 417 and communicates outer end 58 of first tangent groove 417 with coolant inlet 113. Note that first tangent groove 417 has a width decreasing from inner end 56 toward outer end 58. Similarly, second tangent groove 417 includes an inner end 56 in communication with axial hole 54 and an outer end 58 in communication with coolant outlet 114. More specifically, second tangent groove 417 includes first and second sidewalls 60 and 62 and an arcuate bottom wall 64 interconnected between first and second sidewalls 60 and 62. Arcuate bottom wall 64 includes an inner edge 66 located on the inner periphery of retainer 41 and spaced from first side 44. Arcuate bottom wall 64 further includes an outer edge 68 located on second side 46 and spaced from the outer periphery of retainer 41 and shorter than inner edge 66. Note that a spacing between inner edge 66 and first side 44 is smaller than that between outer edge 68 and first side 44. Arcuate bottom wall 64 further includes first and second arcuate lateral edges 70 and 72. First arcuate lateral edge 70 is interconnected between an end of inner edge 66 and an end of outer edge 68. Second arcuate lateral edge 72 is interconnected between the other end of inner edge 66 and the other end of outer edge 68. An opening 74 (FIG. 2) is defined between second side 46 of retainer 41 and restraining ring 12 adjacent to outer end 58 of second tangent groove 417 and communicates outer end 58 of second tangent groove 417 with coolant outlet 114. Note that second tangent groove 417 has a width decreasing from inner end 56 toward outer end 58.

First compression ring 42 includes a plurality of first blocks 421 extending from a side thereof and movably received in first key ways 415 of retainer 41. Second compression ring 43 includes a plurality of second blocks 431 extending from a side thereof and movably received in second key ways 416 of retainer 41.

According to the preferred form shown, second friction ring assembly 5 includes a second rotatable friction ring 51 and a second stationary friction ring 52 both made of abrasion-resistant material. A drive portion 511 is formed on a side of second rotatable friction ring 51 for coupling with second drive pin 221 of shaft sleeve 2, and a seal face 512 is formed on the other side of second rotatable friction ring 51. A seal face 521 is formed on a side of second stationary friction ring 52, and a pressing portion 522 is formed on the other side of second stationary friction ring 52. Seal face 521 of second stationary friction ring 52 is in friction contact with seal face 512 of second rotatable friction ring 51.

In assembly, shaft sleeve 2 is mounted on rotary shaft 61 of machine 6 to rotate therewith. First rotatable friction ring 31 and first stationary friction ring 32 of first friction ring assembly 3 are mounted on shaft sleeve 2 with drive portion 311 of first rotatable friction ring 31 coupled with first drive pin 211 of end cap 21, and with seal face 321 of first stationary friction ring 32 in friction contact with seal face 312 of first rotatable friction ring 31.

Cover 13 of gland 1 is mounted around shaft sleeve 2 with shaft sleeve 2 extending through axial hole 131 and annular wall 132. Second restraining flange 134 of cover 13 restrains axial movement of first stationary friction ring 32. Positioning pin 143 on a side of guide plate 14 is engaged in positioning hole 133 of cover 13. First and second compression rings 42 and 43 and retainer 41 are mounted around shaft sleeve 2. Screws 414 are extended through screw holes 412 of retainer 41 to fix retainer 41 to the inner periphery of annular wall 132 of cover 13. First compression ring 42 abuts against pressing portion 322 of first stationary friction ring 32. First blocks 421 of first compression ring 42 are slideably received in first tangent grooves 415 of retainer 41. Second blocks 431 of second compression ring 43 are slideably received in second key ways 416 of retainer 41. Thus, first and second compression rings 42 and 43 can not rotate but can slide in the axial direction. Through-holes 411 of retainer 41 allow two ends of each flexible element 413 extending therethrough to respectively press against first and second compression rings 42 and 43, providing a cushioning effect for axial movement of first and second compression rings 42 and 43. Cover 13 keeps first and second compression rings 42 and 43 inside flange 11, providing an integral design and avoiding falling of flexible elements 413 during assembly and disassembly.

Figure 4:
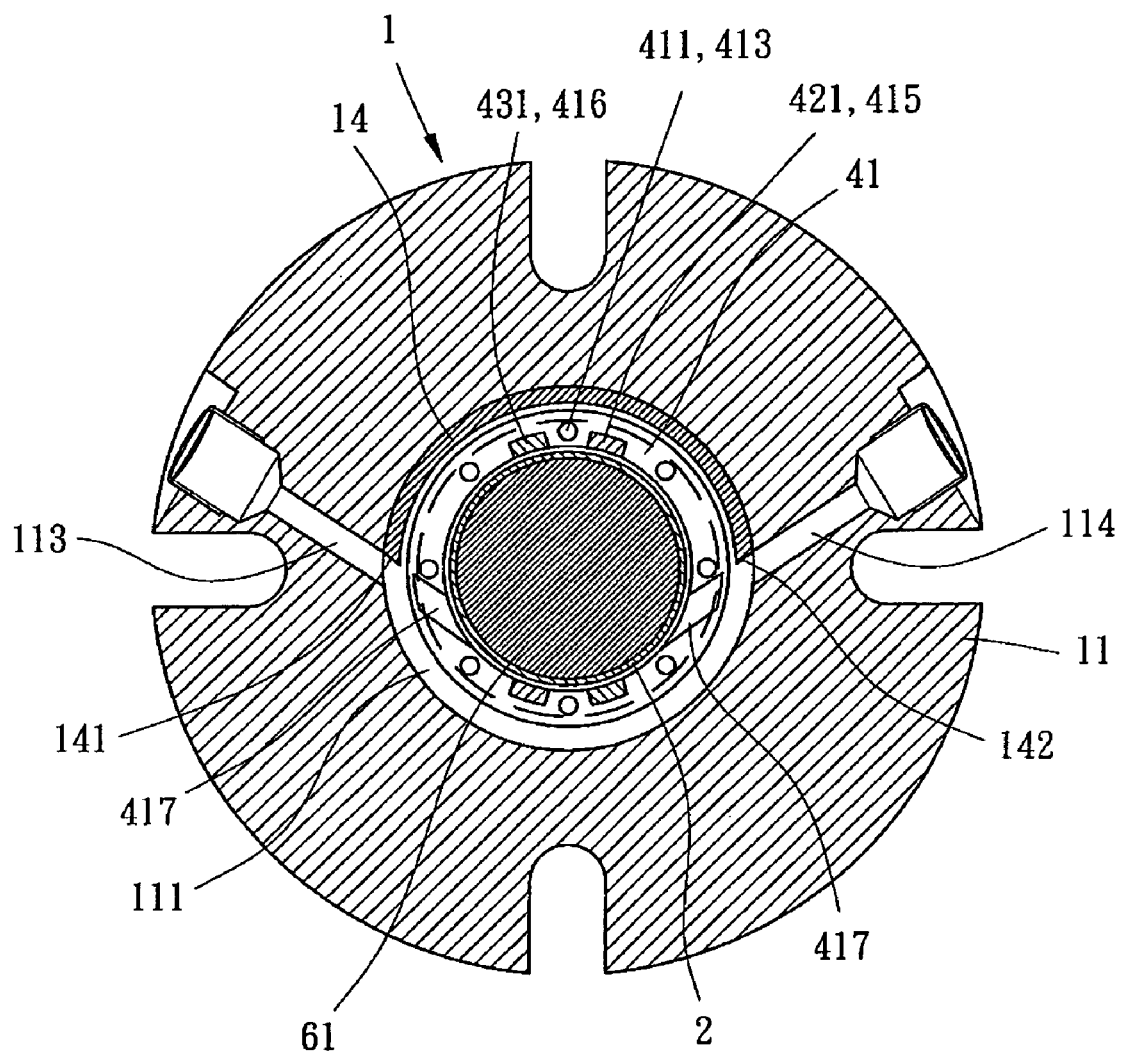
FIG. 4 shows a cross-sectional view of the shaft sealing device of FIG. 1 according to section line 4-4 of FIG. 2.

Flange 11 of gland 1 is mounted around shaft sleeve 2 with pumping groove 23 of shaft sleeve 2 located in axial hole 111 of flange 11. Restraining ring 12 is received in axial hole 111 of flange 11, and positioning hole 122 of restraining ring 12 is engaged with positioning pin 143 on the other side of guide plate 14. Cover 13 is engaged in positioning groove 112 of flange 11. With reference to FIG. 4, guide plate 14 is located in axial hole 111 of flange 11 with first arcuate end face 141 in alignment with a portion of an inner peripheral face of coolant inlet 113, and with second arcuate end face 142 in alignment with a portion of an inner peripheral face of coolant outlet 114. Note that guide plate 14 has an outer side in intimate contact with an inner periphery of flange 11. Gland 1 is fixed to a side of machine 6 with rotary shaft 61 extending through axial hole 111 of flange 11.

Second rotatable friction ring 51 and second stationary friction ring 52 of second friction ring assembly 5 are mounted on shaft sleeve 2 with second compression ring 43 pressing against pressing portion 522 of second stationary friction ring 52, and with seal face 512 of second rotatable friction ring 51 in friction contact with seal face 521 of second stationary friction ring 52. First restraining flange 121 of restraining ring 12 restrains axial movement of second stationary friction ring 52. Screws 25 are extended through screw holes 222 of drive collar 22 and positioning holes 24 to fix drive collar 22 to the other end of shaft sleeve 2. Thus, gland 1, shaft sleeve 2, first friction ring assembly 3, guiding assembly 4, and second friction ring assembly 5 are prevented from disengaging from rotary shaft 61, and shaft sleeve 2 and rotary shaft 61 are fixed to each other.

Figure 2:
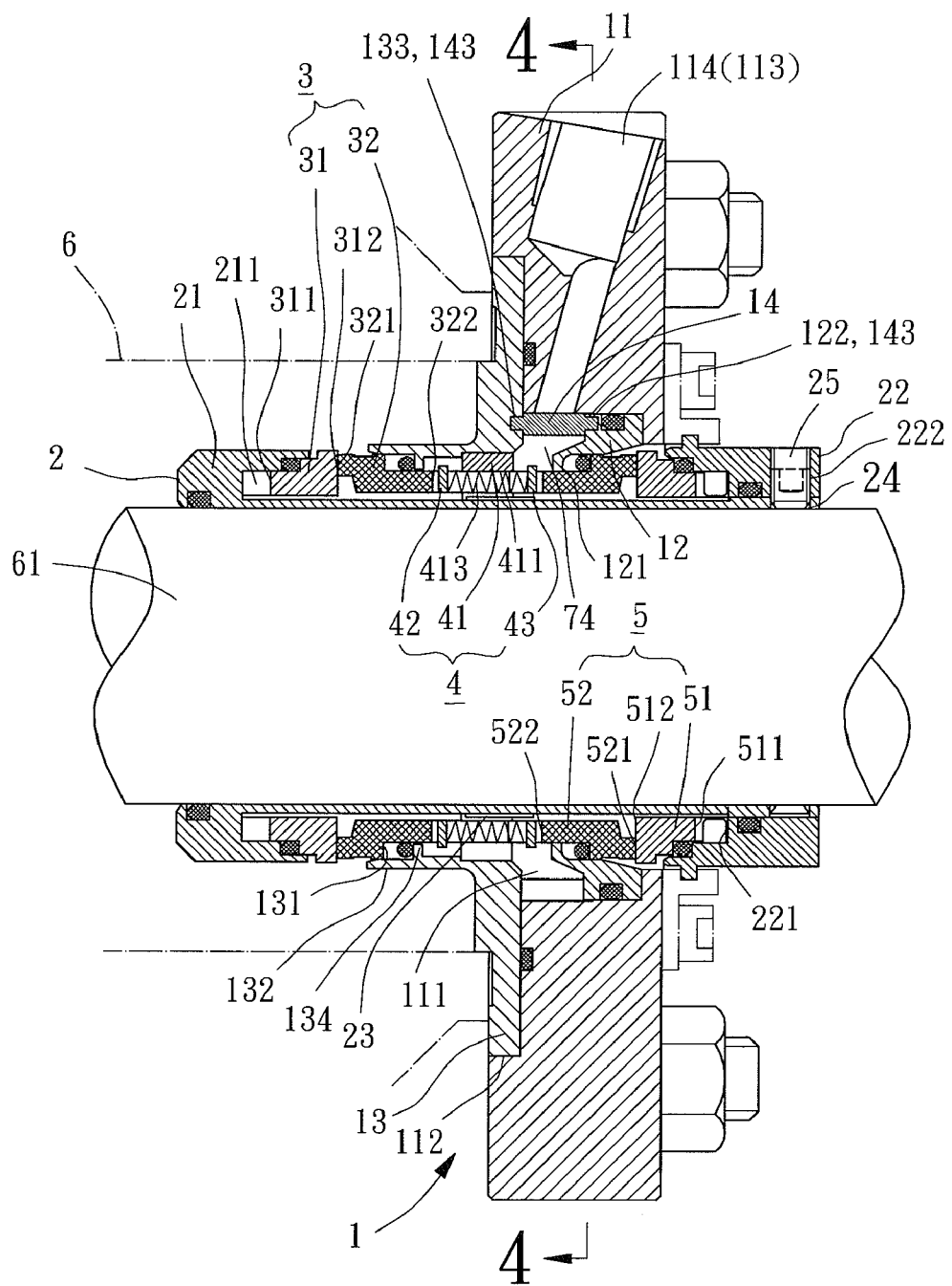
FIG. 2 shows a cross sectional view of the shaft sealing device of FIG. 1 and a rotary shaft on which the shaft sealing device is mounted.
Figure 3:
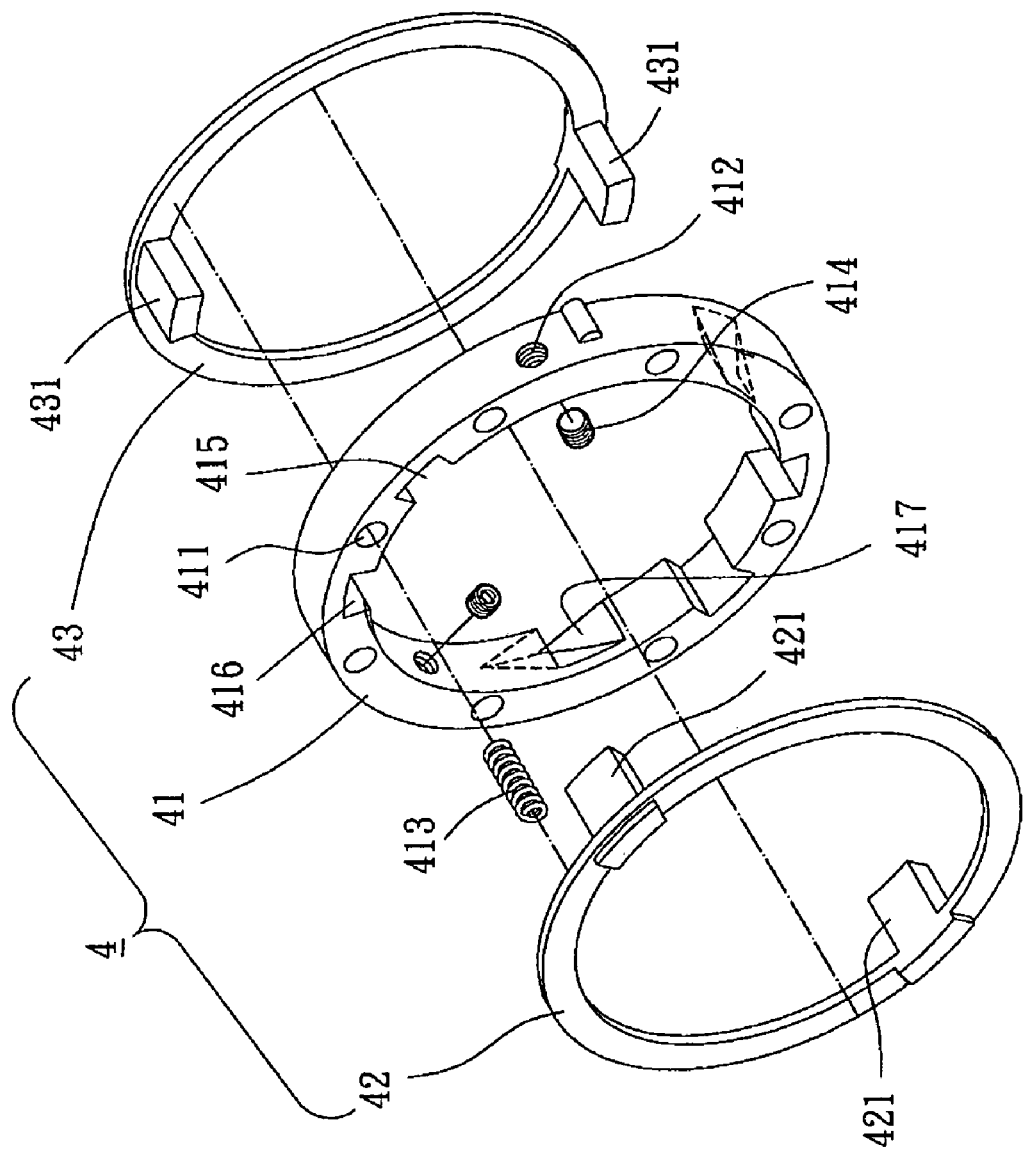
FIG. 3 shows an exploded, perspective view of a guiding assembly of the shaft sealing device of FIG. 1.

With reference to FIGS. 1, 2, and 4, a dual-sealing structure is provided by gland 1, shaft sleeve 2, first and second friction ring assemblies 3 and 5, and guiding assembly 4 of the shaft sealing device according to the preferred teachings of the present invention. Coolant inlet 113 and coolant outlet 114 of flange 11 are coupled with a coolant circulating device (not shown) for supplying coolant into axial hole 111 of flange 11 through coolant inlet 113. Note that coolant is efficiently guided into axial hole 111 of flange 11 by first arcuate end face 141 of guide plate 14 and by first tangent groove 417 of retainer 41 to move heat resulting from friction in first and second friction ring assemblies 3 and 5. Coolant is then efficiently guided to coolant outlet 114 by second tangent groove 417 of retainer 41 and second arcuate end face 142 of guide plate 14. Then, coolant flows from coolant outlet 114 to coolant circulating device. Lubrication is, thus, provided to assure smooth operation of machine 6.

Note that retainer 41 is fixed in axial hole 111 of flange 11 with first blocks 421 of first compression ring 42 slideably engaged in first key ways 415 of retainer 41, and with second blocks 431 of second compression ring 43 slideably engaged in second key ways 416 of retainer 41. Thus, first and second compression ring 42 and 43 can not rotate. However, first compression ring 42, when biased by flexible elements 413, can slide relative to retainer 41 in the axial direction to push first stationary friction ring 32 pressing against first rotatable friction ring 31. Similarly, second compression ring 43, when biased by flexible elements 413, can slide relative to retainer 41 in the axial direction to push second stationary friction ring 52 pressing against second rotatable friction ring 51. Enhanced sealing effect is, thus, provided.

The shaft sealing device having a single-sealing structure disclosed in U.S. Pat. No. 6,935,633 can only be utilized in working environments without volatile or toxic gases, but the shaft sealing device having a dual-sealing structure according to the preferred teachings of the present invention can be utilized in tough working environments with volatile or toxic gases. Furthermore, compared to the shaft sealing device disclosed in U.S. Patent Application Publication No. 2007/0246891 A1, first and second compression rings 42 and 43 of the shaft sealing device having a dual-sealing structure according to the preferred teachings of the present invention can smoothly move first and second stationary friction rings 32 and 52 in the axial direction to enhance the sealing effect of first and second friction ring assemblies 3 and 5 due to the specific arrangement between guiding assembly 4 and first and second friction ring assemblies 3 and 5. An enhanced prevent leakage effect is, thus, provided. Further, first and second compression rings 42 and 43 utilize common flexible elements 413 and, thus, have a less complicated structure. Further, the specific shape of first tangent groove 417 of retainer 41 can efficiently and smoothly guide coolant from coolant inlet 113 to axial hole 111 of flange 11, and the specific shape of second tangent groove 417 of retainer 41 can efficiently and smoothly guide coolant from axial hole 111 of flange 11 to coolant outlet 114. The heat-dissipating effect is, thus, enhanced.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A shaft sealing device comprising, in combination:
a gland including a flange having an axial hole, with the gland further including a coolant inlet in communication with the axial hole and a coolant outlet in communication with the axial hole;
a shaft sleeve extending through the axial hole of the gland and adapted to be mounted around a rotary shaft to rotate therewith, with the shaft sleeve including an end cap on an end thereof and a drive collar on another end thereof, with the end cap including a first drive pin, with the drive collar including a second drive pin;
a first friction ring assembly including a first rotatable friction ring mounted around the shaft sleeve and a first stationary friction ring mounted around the shaft sleeve, with the first rotatable friction ring being coupled with the first drive pin of the shaft sleeve;
a second friction ring assembly including a second rotatable friction ring mounted around the shaft sleeve and a second stationary friction ring mounted around the shaft sleeve, with the second rotatable friction ring being coupled with the second drive pin; and
a guiding assembly mounted between the first and second friction ring assemblies, with the guiding assembly including first and second compression rings mounted around the shaft sleeve and a retainer mounted around the shaft sleeve and between the first and second compression rings, with the retainer including first and second sides and a plurality of through-holes extending from the first side through the second side, with a flexible element extending through each of the plurality of through-holes and including a first end pressing against the first stationary friction ring and a second end pressing against the second stationary friction ring, with the first compression ring pushing the first stationary friction ring to press against the first rotatable friction ring while the second compression ring pushing the second stationary ring to press against the second rotatable friction ring, with the retainer further including a plurality of first key ways and a plurality of second key ways, with the first compression ring including a plurality of first blocks slideably received in the plurality of first key ways, with the second compression ring including a plurality of second blocks slideably received in the plurality of second key ways,
with the retainer further including a first tangent groove having a first inner end in communication with the axial hole and a first outer end in communication with the coolant inlet, with the first tangent groove further including first and second sidewalls and a first arcuate bottom wall interconnected between the first and second sidewalls, with the first arcuate bottom wall including a first inner edge located on an inner periphery of the retainer and a first outer edge, with a first spacing between the first inner edge and the first side of the retainer being smaller than a second spacing between the first outer edge and the first side of the retainer, with the first tangent groove having a width decreasing from the first inner end toward the first outer end, with the retainer further including a second tangent groove having a second inner end in communication with the axial hole and a second outer end in communication with the coolant outlet, with the second tangent groove further including third and fourth sidewalls and a second arcuate bottom wall interconnected between the third and fourth sidewalls, with the second arcuate bottom wall including a second inner edge located on the inner periphery of the retainer and a second outer edge, with a third spacing between the second inner edge and the first side of the retainer being smaller than a fourth spacing between the second outer edge and the first side of the retainer, with the second tangent groove having a width decreasing from the second inner end toward the second outer end.

2. The shaft sealing device as claimed in claim 1, with the gland further including a guide plate mounted in the axial hole, with each of the coolant inlet and the coolant outlet having an inner peripheral face, with the guide plate including first and second arcuate end faces respectively on two ends thereof, with the first arcuate end face being aligned with a portion of the inner peripheral face of the coolant inlet, and with the second arcuate end face being aligned with a portion of the inner peripheral face of the coolant outlet.

3. The shaft sealing device as claimed in claim 2, with the shaft sleeve further including a pumping groove on an outer periphery thereof, and with the pumping groove being received in the axial hole of the flange and adapted for delivering coolant.

4. The shaft sealing device as claimed in claim 2, with the gland further including a restraining ring mounted in the axial hole of the flange, with the restraining ring including a first restraining flange on an inner periphery thereof, with the first restraining flange limiting axial movement of the first stationary friction ring, with the flange including a positioning groove in a side thereof, with the shaft sealing device further comprising, in combination: a cover mounted in the positioning groove of the flange and including an axial hole through which the rotary shaft extends, with the cover further including an annular wall extending outward from a side thereof in a direction parallel to a longitudinal direction of the axial hole thereof, with the annular wall including a second restraining flange on an inner periphery thereof, and with the second restraining flange limiting axial movement of the second stationary friction ring.

5. The shaft sealing device as claimed in claim 4, with the retainer further including a plurality of screw holes each extending from an outer periphery thereof through the inner periphery thereof, and with the retainer further including a plurality of screws each extending through one of the plurality of screw holes to fix the retainer to the inner periphery of the annular wall of the cover.

6. The shaft sealing device as claimed in claim 4, with the cover further including a positioning hole, with the guide plate further including a positioning pin on a side thereof and with the positioning pin being engaged in the positioning hole of the cover.

7. The shaft sealing device as claimed in claim 4, with the first outer edge of the first arcuate bottom wall of the first tangent groove being located on the second side of the retainer and spaced from an outer periphery of the retainer, and with the first arcuate bottom wall further including first and second arcuate lateral edges extending between the first inner edge and the first outer edge.

8. The shaft sealing device as claimed in claim 7, with a first opening formed between the second side of the retainer and the restraining ring and adjacent to the first outer end of the first tangent groove, and with the first opening communicating the first outer end of the first tangent groove with the coolant inlet.

9. The shaft sealing device as claimed in claim 8, with the second outer edge of the second arcuate bottom wall of the second tangent groove being located on the second side of the retainer and spaced from the outer periphery of the retainer, and with the second arcuate bottom wall further including third and fourth arcuate lateral edges extending between the second inner edge and the second outer edge.

10. The shaft sealing device as claimed in claim 9, with a second opening formed between the second side of the retainer and the restraining ring and adjacent to the second outer end of the second tangent groove, and with the second opening communicating the second outer end of the second tangent groove with the coolant outlet.

11. The shaft sealing device as claimed in claim 1, with the first tangent groove being formed in the second side of the retainer, and with the first outer edge of the first arcuate bottom wall of the first tangent groove being located on the second side of the retainer and spaced from the outer periphery of the retainer.

12. The shaft sealing device as claimed in claim 11, with the second tangent groove being formed in the second side of the retainer, and with the second outer edge of the second arcuate bottom wall of the second tangent groove being located on the second side of the retainer and spaced from the outer periphery of the retainer.

13. The shaft sealing device as claimed in claim 1, with the second outer edge of the second arcuate bottom wall of the second tangent groove being located on the second side of the retainer and spaced from the outer periphery of the retainer.

14. The shaft sealing device as claimed in claim 1, with the other end of the shaft sleeve including a plurality of fixing holes, with the drive collar including a plurality of screw holes aligned with the plurality of positioning holes, and with the shaft sealing device further comprising, in combination: a plurality of screws each extending through one of the plurality of screw holes of the drive collar and one of the plurality of fixing holes of the shaft sleeve to fix the drive collar around the shaft sleeve.

* * * * *